United States Patent Office 3,555,728
Patented Jan. 19, 1971

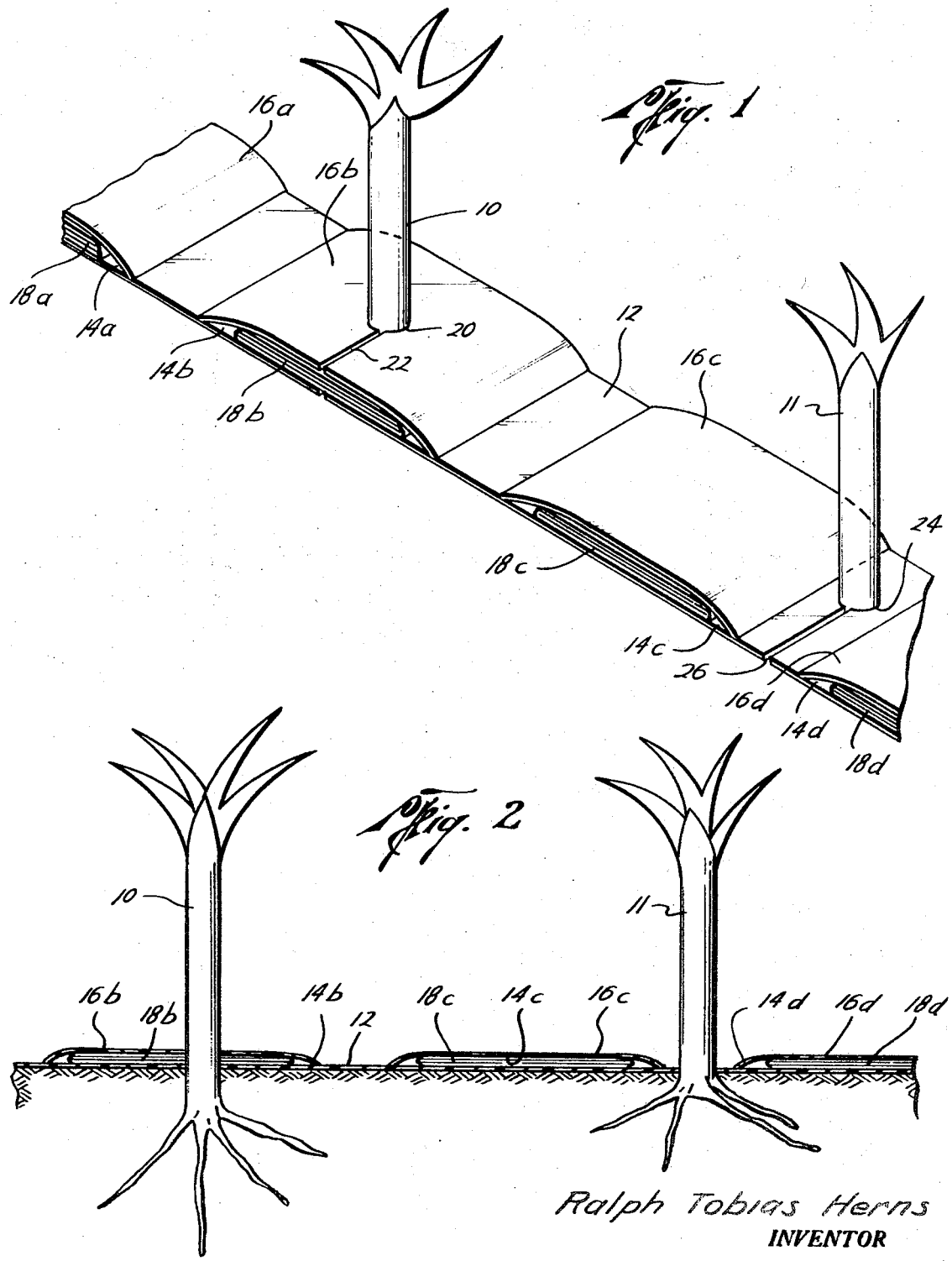

3,555,728
MULCH
Ralph Tobias Herns, 309 Angleton Road,
Lake Jackson, Tex. 77566
Continuation of application Ser. No. 651,238, July 5, 1967. This application Nov. 26, 1969, Ser. No. 880,351
Int. Cl. A01g 7/00
U.S. Cl. 47—9      3 Claims

ABSTRACT OF THE DISCLOSURE

A mulch is described comprising an elongated sheet of flexible, waterproof material having pockets spaced apart along the sheet. The sheet is placed on the ground adjacent or around the plants to be protected by the mulch and weights, such as old newspapers, are inserted into the pockets to hold the mulch in place.

---

This is a continuation of my application Ser. No. 651,238, filed July 5, 1967, and entitled "Mulch."

This invention relates to an improved mulch for placing over the ground adjacent growing plants to protect the plants from weeds and to retard the loss of moisture by evaporation from the ground around the plants.

There is a need for a long-lasting mulch that can be easily located in position around the plants it is to protect, and which will stay in place once installed.

It is an object of this invention to provide such a mulch.

It is another object of this invention to provide a mulch that employs readily available, inexpensive weights to hold the mulch in place around the plants.

It is another object of this invention to provide a mulch which is quickly and easily adapted to different spacings between the plants it is to protect.

These and other objects, advantages, and features of this invention will be apparent to those skilled in the art from a consideration of this application, attached drawing, and appended claims.

The mulch of this invention comprises a sheet of flexible, waterproof material provided with pockets. The pockets are to receive weights to hold the mulch in place adjacent to or around the plants it is to protect. By locating the weights in pockets, inexpensive weight material, such as old newspapers, can be employed for this purpose and they will not be blown away by the wind, and neither will the mulch.

The invention will now be described in connection with the attached drawings, in which, FIG. 1 is an isometric view of the preferred embodiment of the mulch of this invention in place around two plants, and FIG. 2 is a vertical cross section of the mulch shown in FIG. 1.

In the drawings, the mulch is shown positioned to protect around plants 10 and 11. The mulch comprises elongated strip 12 of flexible material provided with a plurality of pockets, designed 14a–14d in the drawing. Preferably, the material from which the strip is made is waterprof and of such a nature that it will at least partially shield the ground adjacent the plants from the direct rays of the sun. Polyethylene is one material which has been found to be satisfactory for this purpose. This material can be obtained in different colors to vary the opacity of the mulch and allow the amount of sunlight through to the ground that is desired for the particular plant it is protecting.

Pockets 14a–14d are formed in the embodiment shown by short strips 16a–16d of flexible material which have their opposite ends attached to elongated strip 12. Usually, the short strips are of the same material as strip 12. These short strips can be located immediately adjacent each other so that there is a continuous series of pockets along strip 12 or they can be spaced apart, as shown in the drawings. The distance between the pockets will be selected in accordance with the weight to be used to hold the mulch inplace and the conditions under which the mulch will be used. In particular, consideration should be given to the amount of wind to which the mulch will be exposed.

One inexpensive and readily available weight that can be used with the mulch of this invention is old newspapers. When this is contemplated, pockets 14a–14d are designed to receive one or two sections of newspaper folded one time. In the drawings, newspaper sections 18a–18d are shown located in the pockets. The mulch is shown with pockets spaced along the top of strip 12. If desired the mulch could be turned over and the pockets made slightly narrower than the strip so that the edges of the strip would protect the material in the pockets. This would be advantageous where the weight material to be used would be damaged by rain and wind.

When the mulch is laid along the row of plants to be protected as shown, as the mulch reaches each plant and opening, such as opening 20, is cut in the mulch to receive plant stalk 10. Slit 22 connects the opening to the outside edge of the mulch to allow the mulch to be installed around the plant easily. It also allows the mulch to be removed without having to damage the leaves of the plant. Similarly, opening 24 and slit 26 are formed in the mulch to receive plant stalk 11. Openings 20 and 24 can be preformed in the mulch along with slits 22 and 24, if the spacing of the plants is predetermined. Also, such openings can be preformed in the strip, where the mulch is to be laid and seeds are to be planted through the openings in the strip to come up through the openings.

In the embodiment shown pockets 14a–14d are open on both sides of the strip. This allows the weights to be positioned in the pockets from either side, whichever is most convenient. The pockets could be closed at one end if desired and this may well be advantageous, where there is a prevailing wind from one direction and the closed end of the pocket can be located to face in the direction of the prevailing wind. This would be particularly advantageous where the weight to be used in holding the mulch in place is one that could be blown out of the pocket by the wind or which would be damaged by rain.

Where the plant and the pocket coincide, as does plant 10 and pocket 14b, the weight can be split to fit around the stalk, as is newspaper section 18b, or the weight can be omitted from this pocket.

From the foregoing, it will be seen that this invention is one well adapted to attain all of the ends and objects hereinabove set forth, together with other advantages, which are obvious and which are inherent to the structure.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

The invention having been described, what is claimed is:

1. A mulch for plants comprising an elongated strip of flexible material for covering the ground adjacent the plants and a plurality of relatively short strips of flexible material spaced along said elongated strip and having their opposite sides attached to the strip thereby providing longitudinally thereon a plurality of pockets each having an opening therein, and weights in the pockets to hold the elongated strip in place on the ground.

2. The mulch of claim 1 in which the short strips are substantially equal in width to the elongated strip.

3. The mulch of claim 1 in which the sides of the short strips that are attached to the elongated strip extend transverse the elongated strip.

References Cited

UNITED STATES PATENTS

| | | | |
|---|---|---|---|
| 1,910,289 | 5/1933 | Hoag | 47—9 |
| 3,206,892 | 9/1965 | Telkes et al. | 47—29 |

ROBERT E. BAGWILL, Primary Examiner